W. MacNEECE.
RESILIENT TIRE.
APPLICATION FILED MAR. 30, 1917.

1,230,588.

Patented June 19, 1917.
3 SHEETS—SHEET 1.

ON LINE 2-2 FIG.4.

INVENTOR
William MacNeece.
BY
ATTORNEYS

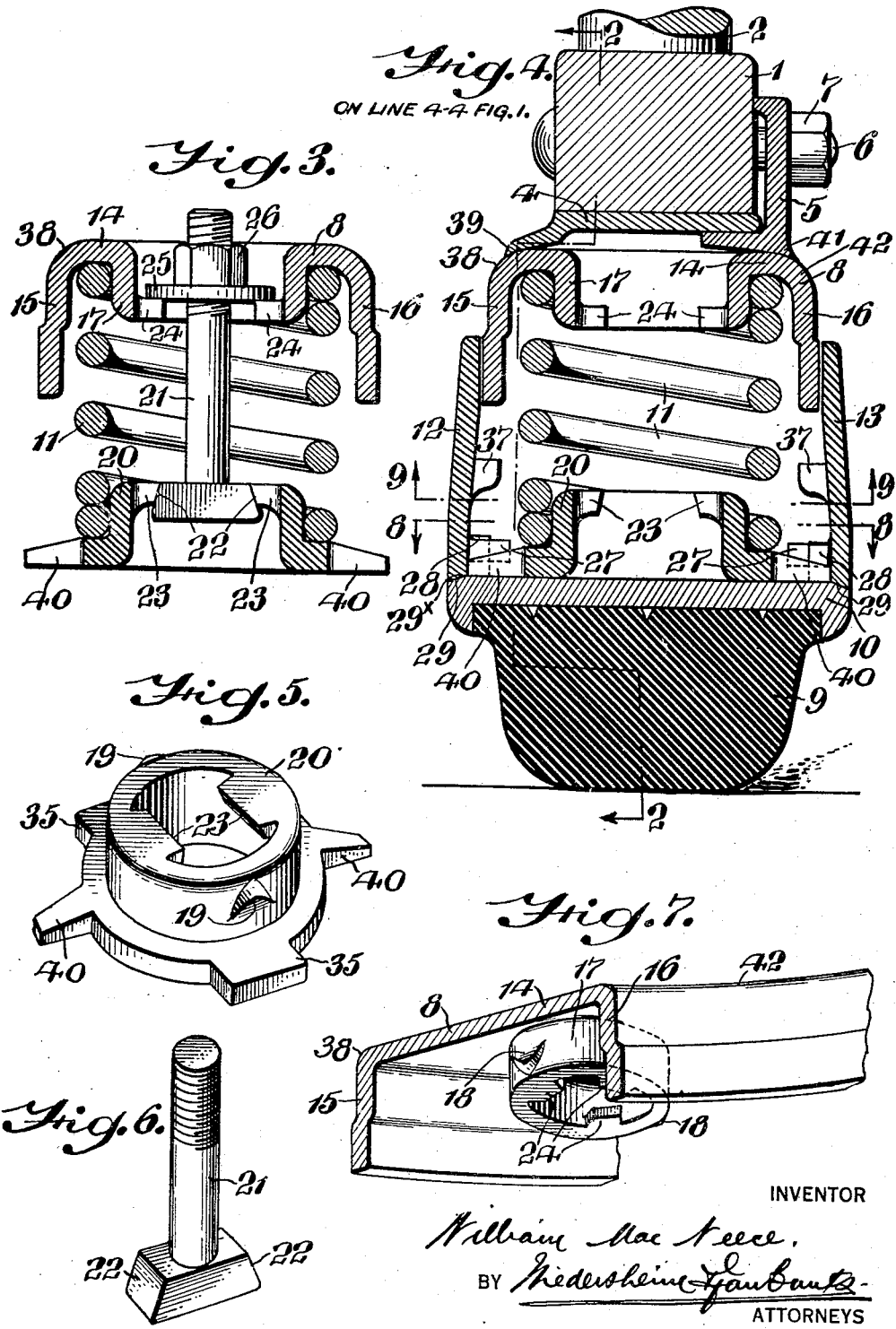

W. MacNEECE.
RESILIENT TIRE.
APPLICATION FILED MAR. 30, 1917.
1,230,588.
Patented June 19, 1917.
3 SHEETS—SHEET 3.
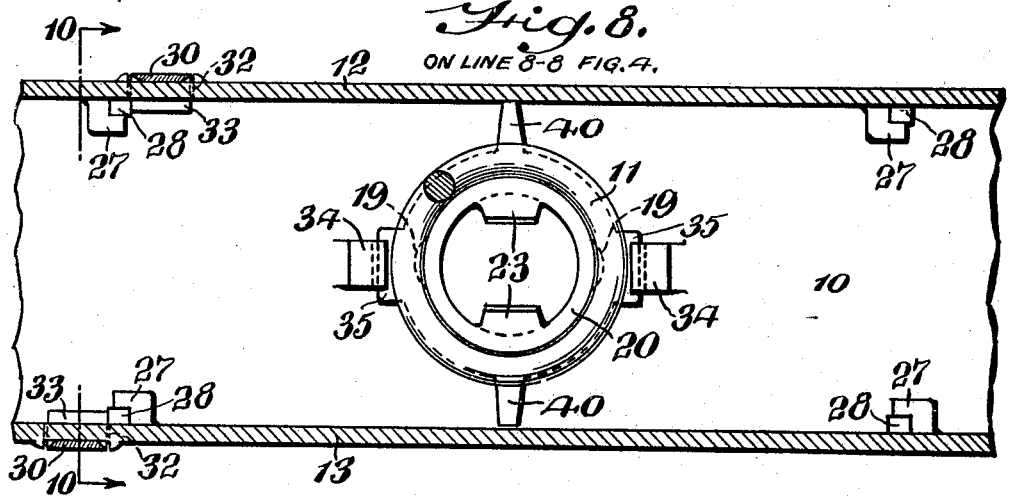
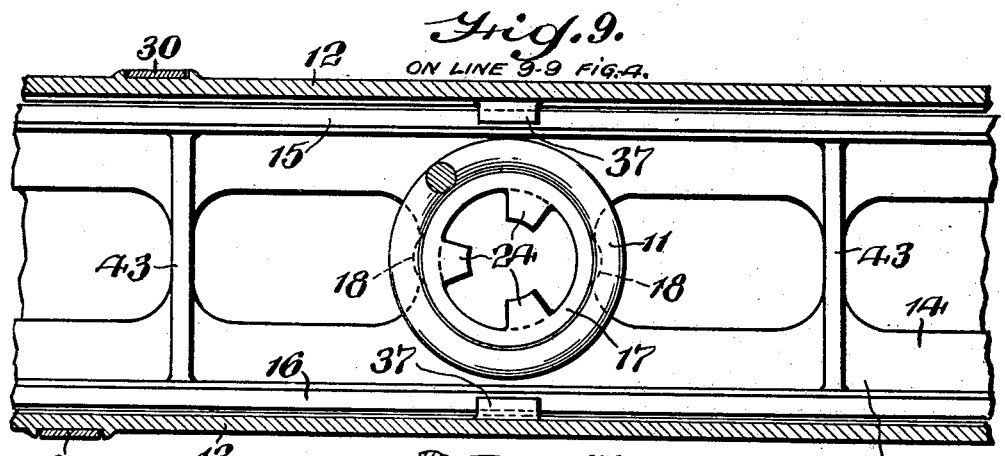
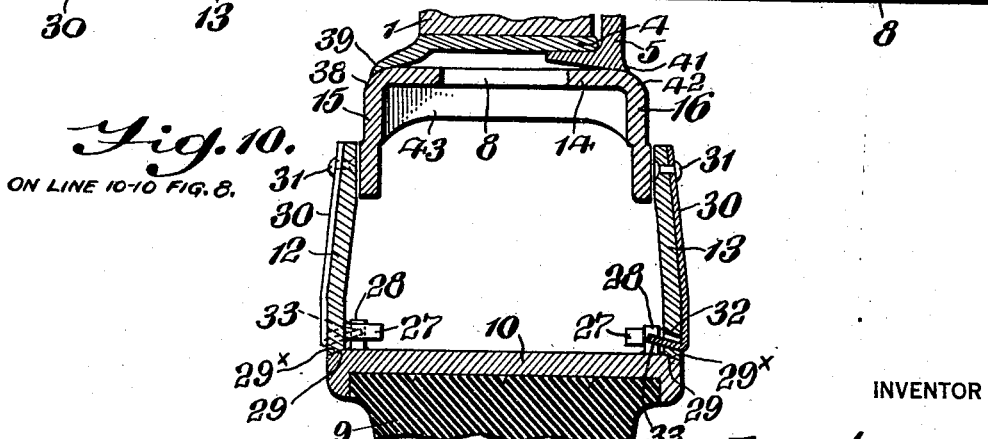
INVENTOR
William MacNeece
BY Wiedersheim & Fairbanks
ATTORNEYS

UNITED STATES PATENT OFFICE.

WILLIAM MacNEECE, OF PHILADELPHIA, PENNSYLVANIA.

RESILIENT TIRE.

1,230,588.  Specification of Letters Patent.  Patented June 19, 1917.

Application filed March 30, 1917. Serial No. 158,545.

*To all whom it may concern:*

Be it known that I, WILLIAM MACNEECE, a citizen of the United States, residing in the city and county of Philadelphia, State of Pennsylvania, have invented a new and useful Resilient Tire, of which the following is a specification.

My present invention relates to a novel construction of a resilient tire which may be employed in conjunction with any desired type of vehicle wheel and which is especially adapted to be employed in conjunction with the wheels of motor driven vehicles.

One object of my invention is to devise a resilient tire which will have the general appearance of the ordinary type of pneumatic tire now in use and which can be used as a demountable equipment in conjunction with any desired or conventional type of vehicle wheel.

Another object of my invention is to devise a resilient tire of the spring type, wherein the necessity of employing a number of nuts, bolts, screws, and other complicated parts, is entirely dispensed with, and wherein the number of parts required is reduced to a minimum.

With the above and other objects in view, which will hereinafter more clearly appear in the detailed description, my invention comprehends a novel, resilient, tire wherein an inner and outer rim are employed, and between said rims a series of springs are arranged and secured in position in a novel manner.

It further consists of a novel construction of a resilient tire comprising an inner and outer rim, novel means for assembling springs with respect thereto, and a novel construction and arrangement of thrust resisting side rings.

It further consists of a novel construction of an inner rim, a novel construction of spring positioning devices, and a novel construction of side rings.

Other novel features of construction and advantage will hereinafter appear in the detailed description.

For the purpose of illustrating my invention, I have shown in the accompanying drawings a typical embodiment of it which is at present preferred by me, since this embodiment will give in practice satisfactory and reliable results, although it is to be understood that the various instrumentalities of which my invention consists can be variously arranged and organized and that my invention is not limited to the precise arrangement and organization of these instrumentalities as herein shown and described.

Fig. 3 represents a section similar to that of Fig. 4 with the inner rim, one of the cup plates and one of the springs held together by the assembly bolt, an accessory, prior to application to the outer rim or tread portion of the tire.

Fig. 4 represents a section on the line 4—4 of Fig. 1.

Fig. 5 represents a perspective view of one of the cup plates for positioning the springs in relation to the outer rim.

Fig. 6 represents a perspective view of one of the assembly bolts.

Fig. 7 represents a fragmentary perspective view illustrating one of the cup projections of the inner rim.

Fig. 8 represents a section on line 8—8 of Fig. 4.

Fig. 9 represents a section on the line 9—9 of Fig. 4.

Fig. 10 represents a section on the line 10—10 of Fig. 8.

Similar numerals of reference indicate corresponding parts in the figures.

Figure 1:
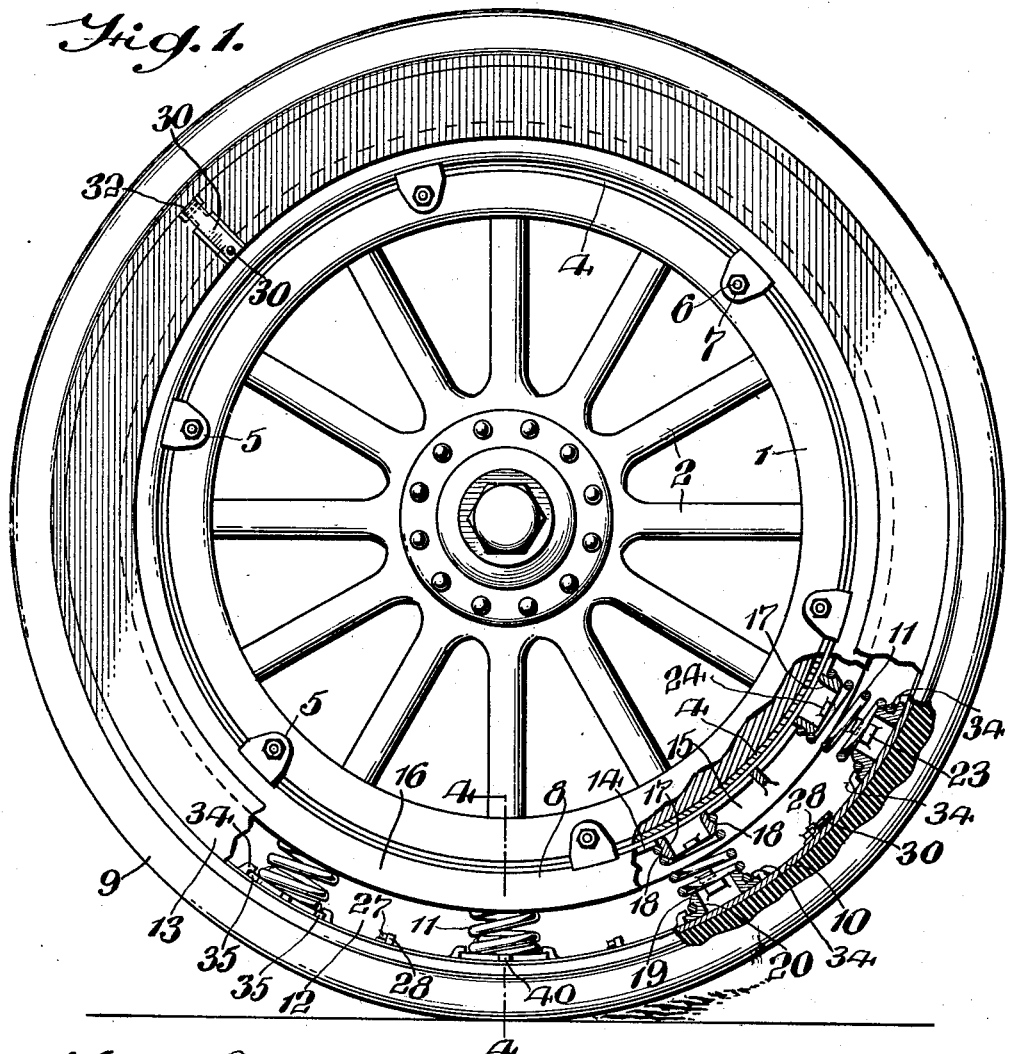
Figure 1 represents a side elevation, partly broken away, of a resilient tire embodying my invention, and shown in assembled relation with respect to a vehicle wheel.
Figure 2:
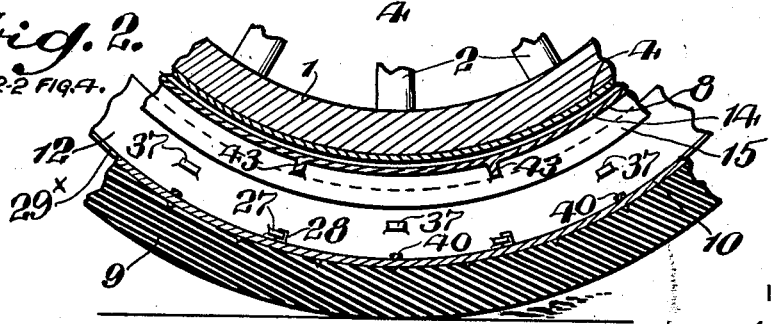
Fig. 2 represents a fragmentary sectional view on the line 2—2 of Fig. 4.

Referring to the drawings:

1 designates the felly of the wheel and 2 the spokes. 4 designates the felly band secured to the felly and provided with an outward extension 39, the outward periphery of which is curved outwardly. 5 designates wedge clamps formed with outwardly curved extensions 41 and provided with means to secure them in position consisting of the bolts 6 passing through the felly and nuts 7 to hold the inner annular rim 8 in assembled position with respect to the felly band.

9 designates the tread of the wheel preferably of elastic material vulcanized in any suitable manner to the outer rim 10 between which latter and the inner rim 8 are located the cushions or springs 11 which are inclosed by the detachable annular side plates 12 and 13 of the outer rim 10, and the depending annular flanges 15 and 16 of the inner rim 8 which are adapted to telescope within the annular side plates 12 and 13 which form a part of the outer rim. The construction, assembly and adaptation to the ordinary vehicle wheel of the above mentioned parts which my invention comprehends will now be more fully described in detail.

The inner rim 8 is U-shaped in cross section. 14 designates the bridge-plate thereof reinforced by cross ribs 43. 15 and 16 designate the depending annular flanges extending between the annular side plates 12 and 13 to form a complete, telescoping closure or casing for the springs 11. The flanges 12 and 13 and 15 and 16 also act as thrust resisting members between the inner and outer rims. The bridge plate 14 of the inner rim is outwardly deflected at spaced intervals on its periphery to form a series of cupped projections or annular flanges 17 around which the inner ends of the spring 11 are positioned and held by the external lugs 18. The outer portion of the spring 11 is secured in a similar manner by lugs 19 to the spring positioning members 20 which are carried by the outer rim.

To position the spring positioning members or cupped projections 20 and springs 11 with respect to the inner rim as a unitary structure for connection with the tread rim 10, an assembly bolt 21, an accessory, is provided and is formed with a rectangularly shaped head with the two smaller sides beveled as at 22 to engage the bevel of the lugs 23 of the spring positioning members 20,— while the cupped projections 17 of the inner rim 8 are provided with the lugs 24, Fig. 3, against which washers 25 bear so as to form a resisting base for the nuts 26 which are threaded on the bolt 21 and which adjust the cup plates 20 to the proper distance concentrically from the inner rim against the outward thrust of the springs 11.

The detachable annular side plates 12 and 13 are provided with angular finger lugs 27, Fig. 8, to engage the lugs 28 on the outer rim 10 so as to form a bayonet-joint to lock the plates 12 and 13 to the outer rim 10.

To further insure a tight connection between the annular plates 12 and 13 and the outer rim 10, beveled edges 29 and 29$^x$, Fig. 10, are provided to form a wedge joint when the bayonet joints are moved into locked position. To prevent the bayonet joint from becoming unlocked through the jolting and jaring of the wheel, I provide what I term snap springs 30 secured to the side plates 12 and 13 by rivets 31, the lower inturned ends 33 of which project through the openings 32 in the slide plates 12 and 13 and engage the opposite faces of the lugs 28 of the outer rim 10 to hold the latter in a fixed relation to the abutments 27 on the annular side plates 12 and 13.

The outer rim 10 is provided with a series of pairs of angular lugs 34, Fig. 1, under the overhang of which the lugs 35, Fig. 5, of the spring positioning members 20 are inserted to position said spring-positioning members 20 equidistantly around the inner periphery of the outer rim 10 to hold the members 20 against longitudinal movement. Transversely extending lugs 40 on the spring positioning members 20 extend between the inner faces of the side plates 12 and 13 to position the cup plates 20 centrally of the outer rim.

The buffer lugs 37 on the side plates 12 and 13 extend inwardly in the path of travel of the depending annular flanges 15 and 16 of the inner rim 8, for the purpose of limiting the yielding movement between the inner and outer rims when the strain of the load or traction is such as to cause undue compression of the springs 11.

In the assembling of my tire, I first secure the detachable plate 12 through the bayonet and lock connection 27, 28, to the outer rim 10. I next combine the inner rim 8, the springs 11 and the spring positioning members 20 into a unitary structure with the spring positioning members at the proper distances around the inner rim. I then place this structure as a unit in position on the inside of the outer rim 10 with the lugs 35 of the cup plates engaging under the angular lugs 34 and with one of the transverse lugs 40 making contact with the inner face of the plate 12 secured to the outer rim. I then place the other annular plate 13 in position and lock it to the outer rim.

After all this has been done the assembly bolts are removed and the completed tire is ready for attaching to the felly of the wheel.

This is accomplished in the ordinary manner of mounting a tire on a demountable rim which is done by first removing the flared wedge clamps 5 from the felly, moving the assembled tire inward until the curved surface 38 of the inner rim 8 makes contact with the flared portion 39 of the felly band 4, then inserting and tightening by means of the bolts 5 and nuts 6 the flared wedge clamps 5 so as to cause the flared portion 41 of the clamps to make contact with the curved surface 42 of the inner rim and firmly grip the rim between the annular flared portion 38 of the felly band 4 and flared portion 41 of the flared wedge clamps 5, thereby securing the tire against sidewise movement with respect to the felly.

It will now be apparent that I have devised a novel and useful construction of a resilient tire which embodies the features of advantage enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a resilient tire of the character described, an inner rim,—an outer rim,—a plurality of compression springs between said rims,—cupped projections on the outside periphery of said inner rim formed of outwardly extending annular flanges and located equidistantly longitudinally and centrally transversely of said inner rim,—cupped projections on the inside periphery of said outer rim formed of inwardly extending annular flanges removably secured to said outer rim,—and means for positioning said cupped projections equidistant longitudinally and transversely central of said outer rim,—inwardly extending side annular flanges removably secured to said outer rim,—outwardly extending flanges on said inner rim adapted to extend between and in adjacency to the flanges on said outer rim and form side thrust resisting means between said outer and inner rims.

2. In a resilient tire of the character described, an inner rim,—an outer rim,—outwardly extending side flanges on said inner rim,—inwardly extending detachable side flanges on said outer rim,—a plurality of cupped projections formed on the outside periphery of said inner rim equidistantly of each other longitudinally and transversely central between said flanges on said inner rim,—means for removably securing and locating on the inside periphery of the outer rim a plurality of cupped projections equidistant longitudinally and transversely central between the removably secured flanges on said outer rim,—and a plurality of compression springs between said rims positioned by and detachably secured to said cupped projections.

3. In a resilient tire of the character described, an inner rim,—an outer rim,—outwardly extending side flanges on said inner rim, inwardly extending side flanges on said outer rim,—a plurality of cupped projections formed on the outside periphery of said inner rim equidistant of each other longitudinally and transversely central between said flanges on said inner rim,—a plurality of pairs of angular lugs equidistantly disposed longitudinally around the inside periphery of said outer rim,—a series of removable cupped projections,—longitudinally extending lugs on said cupped projections engaging under the angular lugs on the inside periphery of the outer rim,—transversely extending lugs on said cup projections to position said cup projections transversely central between the side flanges on the outer rim,—and a plurality of compression springs between said rims positioned by and detachably secured to said cupped projections.

4. In a resilient tire of the character described, an inner rim,—an outer rim,— a series of compression springs between said rims,—cupped projections on the outside periphery of said inner rim, formed of outwardly extending flanges and located equidistantly longitudinally and transversely central of said inner rims,—cupped projections on the inside periphery of said outer rim formed of inwardly extending flanges removably secured to said rim,—means for positioning said cupped projections equidistantly longitudinally and centrally transversely of said outer rim,—inwardly extending side annular flanges removably secured to said outer rim,—outwardly extending flanges on said inner rim extending inside of and in adjacency to the flanges on said outer rim,—and buffer lugs on the flanges of said outer rim placed in the path of travel of the outside free edge of the flanges of said inner rim, which limit the compression of the springs under excessive load and cause the outer rim and inner rim to travel as a solid unit.

5. In a resilient tire of the character described,—an inner rim,—outwardly extending side annular flanges on said inner rim,—an outer rim,—lugs on said outer rim,—a plurality of springs between said rims,— inwardly extending side annular flanges,— angular fingers on said flanges adapted to engage said lugs on said outer rim to form a bayonet joint to hold said flanges against longitudinal movement in one direction with respect to said outer rim,—and means carried by said flanges adapted to engage said lugs on said outer rim to hold said flanges against longitudinal movement in the other direction with respect to said outer rim.

6. In a resilient tire of the character described,—an inner rim,—outwardly extending side annular flanges on said inner rim,— an outer rim,—lugs on said outer rim,—a plurality of springs between said rims,—inwardly extending side annular flanges,— angular fingers on said flanges adapted to engage said lugs on said outer rim to form a bayonet joint to hold said flanges against longitudinal movement in one direction with respect to said outer rim,—snap springs carried by said flanges and adapted to be moved into engagement with said lugs of said outer rim to hold said flanges against longitudinal movement in the other direction with respect to said outer rim.

7. In a resilient tire of the character described, an inner rim,—an outer rim,—a plurality of springs between said rims, annular flanged projections seating and positioning said springs between said inner and outer rims,—annular flanges on said inner and outer rims so telescopically arranged with relation to each other as to form an adjustable and thrust resisting means between said outer and inner rims together with means for compressing said springs in relation to said inner rim preparatory to the insertion of said inner rim and springs in said outer rim.

8. In a resilient tire of the character described, an inner rim,—an outer rim,—a plurality of springs,—said springs at their inner ends seated and positioned over annular flanged projections of said inner rim,—the outer ends of said springs seated and positioned over annular flanged members, lips on said annular flanged projections of said inner rim and of said annular flanged members to hold said annular flanged members, springs and inner rim as a unitary structure, and means for compressing said springs preparatory to bringing the inner rim, springs and annular flanged members into operative relation to said outer rim.

9. In a resilient tire of the character described, an inner rim,—an outer rim,—a plurality of compression springs between said rims,—cupped projections on the outside periphery of said inner rim formed of outwardly extending annular flanges, cupped projections on the inside periphery of said outer rim formed of inwardly extending annular flanges removably secured to said outer rim, said cupped projections seating and positioning said springs between said inner and outer rims, inwardly extending side annular flanges removably secured to said outer rim,—outwardly extending flanges on said inner rim adapted to extend between and in adjacency to the flanges on said outer rim to form an adjustable closure for said springs, and thrust resisting means between said outer and inner rims.

In testimony whereof I have hereunto signed my name this twenty-eighth day of March, 1917.

WILLIAM MacNEECE.

In the presence of—
J. BOMAN TAYLOR,
M. E. BYRNE.

Copies of this patent may be obtained for five cents each, by addressing the "Commissioner of Patents. Washington, D. C."